US011975347B2

(12) United States Patent
Bayat et al.

(10) Patent No.: US 11,975,347 B2
(45) Date of Patent: May 7, 2024

(54) TWO-LAYER MESH ELEMENT FOR AN ATOMISER ASSEMBLY

(71) Applicant: Philip Morris Products S.A., Neuchatel (CH)

(72) Inventors: Dara Bayat, Neuchatel (CH); Michel Bessant, Neuchatel (CH); Jerome Christian Courbat, Neuchatel (CH); Olivier Dubochet, Neuchatel (CH); Ivar Kjelberg, Neuchatel (CH); Philippe Niedermann, Peseux (CH); Pascal André Daniel Jean Pratte, Peseux (CH)

(73) Assignee: Philip Morris Products S.A., Neuchatel (CH)

(*) Notice: Subject to any disclaimer, the term of this patent is extended or adjusted under 35 U.S.C. 154(b) by 729 days.

(21) Appl. No.: 17/054,046

(22) PCT Filed: May 16, 2019

(86) PCT No.: PCT/EP2019/062730
§ 371 (c)(1),
(2) Date: Nov. 9, 2020

(87) PCT Pub. No.: WO2019/219873
PCT Pub. Date: Nov. 21, 2019

(65) Prior Publication Data

US 2021/0120878 A1 Apr. 29, 2021

(30) Foreign Application Priority Data

May 16, 2018 (EP) .................................... 18172756

(51) Int. Cl.
*B05B 17/00* (2006.01)
*A24F 40/10* (2020.01)
(Continued)

(52) U.S. Cl.
CPC .......... *B05B 17/0638* (2013.01); *A24F 40/46* (2020.01); *A24F 40/485* (2020.01);
(Continued)

(58) Field of Classification Search
CPC ........ A24F 40/70; A24F 40/485; A24F 40/46; A24F 40/50; A24F 40/10; B05B 17/0638;
(Continued)

(56) References Cited

U.S. PATENT DOCUMENTS

| | | | |
|---|---|---|---|
| 6,196,219 | B1 | 3/2001 | Hess et al. |
| 2013/0334338 | A1 | 12/2013 | Hogan |

(Continued)

FOREIGN PATENT DOCUMENTS

| | | | |
|---|---|---|---|
| CN | 101703798 | A | 5/2010 |
| EP | 1 129 741 | A2 | 9/2001 |

(Continued)

OTHER PUBLICATIONS

Combined Chinese Office Action and Search Report dated Jan. 18, 2022 in Chinese Patent Application No. 201980028223.X (with English translation), 17 pages.

(Continued)

*Primary Examiner* — Khiem M Nguyen
(74) *Attorney, Agent, or Firm* — Oblon, McClelland, Maier & Neustadt, L.L.P.

(57) ABSTRACT

A mesh element for an atomiser assembly is provided, including: a first layer defining at least one channel including a minimum cross-sectional area; and a second layer overlying the first layer and defining at least one nozzle including a maximum cross-sectional area, the second layer including an inner surface facing the first layer and an outer surface facing away from the first layer, the at least one nozzle overlying the at least one channel, and the maximum cross-sectional area of the at least one nozzle being smaller
(Continued)

than the minimum cross-sectional area of the at least one channel, and the outer surface of the second layer defining an annular portion extending around the at least one nozzle, the annular portion having a semi-circular cross-sectional shape, and a thickness of the second layer at each annular portion being larger than a thickness of the second layer between adjacent annular portions.

14 Claims, 3 Drawing Sheets

(51) Int. Cl.

| | |
|---|---|
| ***A24F 40/46*** | (2020.01) |
| ***A24F 40/485*** | (2020.01) |
| ***A24F 40/50*** | (2020.01) |
| ***A24F 40/70*** | (2020.01) |
| ***B05B 17/06*** | (2006.01) |
| ***H05B 3/12*** | (2006.01) |

(52) U.S. Cl.
CPC .............. *A24F 40/50* (2020.01); *A24F 40/70* (2020.01); *B05B 17/0646* (2013.01); *B05B 17/0676* (2013.01); *H05B 3/12* (2013.01); *A24F 40/10* (2020.01); *H05B 2203/013* (2013.01); *H05B 2203/021* (2013.01)

(58) Field of Classification Search
CPC ... B05B 17/0646; B05B 17/0676; H05B 3/12; H05B 2203/013; H05B 2203/021
USPC .......................................................... 131/329
See application file for complete search history.

(56) References Cited

U.S. PATENT DOCUMENTS

| | | | |
|---|---|---|---|
| 2013/0334339 | A1 | 12/2013 | Xu |
| 2015/0101596 | A1 | 4/2015 | Hogan |
| 2016/0130715 | A1 | 5/2016 | Xu |
| 2017/0350030 | A1 | 12/2017 | Xu |

FOREIGN PATENT DOCUMENTS

| | | | |
|---|---|---|---|
| JP | 2014-506172 | A | 3/2014 |
| JP | 2015-527481 | A | 9/2015 |
| RU | 2016 105 522 | A | 8/2017 |
| UA | 49 447 | U | 4/2010 |
| WO | WO 2017/076590 | A1 | 5/2017 |
| WO | WO 2017/149165 | A1 | 9/2017 |
| WO | WO 2019/219457 | A1 | 11/2019 |
| WO | WO 2019/219865 | A1 | 11/2019 |
| WO | WO 2019/219875 | A1 | 11/2019 |

OTHER PUBLICATIONS

International Search Report and Written Opinion dated Jul. 29, 2019 in PCT/EP2019/062730 filed May 16, 2019.
Office Aciton dated Feb. 27, 2023 in Japanese Patent Application No. 2020-563528 (with English translation), 4 pages.
Russian Decision to Grant dated Sep. 20, 2022 in Russian Patent Application No. 2020140015 (with English traslation), 17 pages.
Russian Search Report dated Sep. 20, 2022 in Russian Patent Application No. 2020140015 (with English translation), 4 pages.

TWO-LAYER MESH ELEMENT FOR AN ATOMISER ASSEMBLY

The present invention relates to a mesh element for an atomiser assembly, the mesh element comprising first and second layers. The present invention also relates to an atomiser assembly comprising the mesh element, an aerosol-generating device comprising the atomiser assembly, and an aerosol-generating system comprising the aerosol-generating device.

Handheld electrically operated aerosol-generating systems that consist of a power supply section comprising a battery and control electronics, and a cartridge comprising a supply of liquid aerosol-forming substrate held in a storage portion and an electrically operated atomiser assembly are known. In some examples, the atomiser assembly may comprise an electrical heating element for generating an aerosol by heating and vaporising the liquid aerosol-forming substrate.

Some devices comprise an atomiser assembly comprising a mesh element defining one or more nozzles, wherein the device is arranged to supply the liquid aerosol-forming substrate to one side of the mesh element. The mesh element may be vibrated against the supply of liquid aerosol-forming substrate to generate an aerosol by forcing droplets of liquid aerosol-forming substrate through the nozzles. This arrangement may be referred to as an active mesh element.

Alternative arrangements may comprise an actuator arranged to vibrate the supply of liquid aerosol-forming substrate against the mesh element to force droplets of liquid aerosol-forming substrate through the nozzles. This arrangement may be referred to as a passive mesh element.

An atomiser assembly comprising a mesh element will exhibit a minimum droplet size that may be generated by the atomiser assembly for a particular liquid aerosol-forming substrate. Typically, a small droplet size is desired to maximise pulmonary delivery of the aerosolised liquid aerosol-forming substrate.

One means for reducing the droplet size produced by a mesh element is to reduce the cross-sectional size of nozzles. However, smaller cross-sectional nozzle sizes require a larger pressure to force liquid aerosol-forming substrate through the nozzles. Therefore, in known systems comprising a mesh element, further reduction of the cross-sectional size of the nozzles is typically prevented when the required increase in liquid pressure is prohibitively large.

It would be desirable to provide a mesh element for an atomiser assembly that facilitates generation of an aerosol exhibiting a small droplet size. It would be desirable to provide a mesh element that reduces or minimises a pressure required to force liquid through one or more nozzles defined by the mesh element.

According to a first aspect of the present invention there is provided a mesh element for an atomiser assembly. The mesh element comprises a first layer defining at least one channel, the at least one channel comprising a minimum cross-sectional area. The mesh element also comprises a second layer overlying the first layer, wherein the second layer defines at least one nozzle comprising a maximum cross-sectional area. The at least one nozzle overlies the at least one channel and the maximum cross-sectional area of the at least one nozzle is smaller than the minimum cross-sectional area of the at least one channel.

As used herein, the term “nozzle” refers to an aperture, hole or bore through the mesh element that provides a passage for liquid to move through the mesh element.

The present inventors have recognised that reducing the length of a nozzle reduces the pressure required to force liquid through the nozzle. The mesh element according to the present invention comprises a first layer defining at least one channel and a second layer defining at least one nozzle overlying the at least one channel, wherein the maximum cross-sectional area of the at least one nozzle is smaller than the minimum cross-sectional area of the at least one channel.

Advantageously, the larger cross-sectional area of the at least one channel compared to the cross-sectional area of the at least one nozzle means that the length of the at least one channel does not contribute to the length of the at least one nozzle. In other words, the thickness of the first layer of the mesh element does not form part of the length of the nozzles defined by the second layer of the mesh element. Therefore, fora given liquid, the pressure required to force the liquid through the at least one nozzle is determined only by a minimum cross-sectional area of the at least one nozzle and the length of the at least one nozzle.

Advantageously, the thickness of the second layer may be selected to reduce or minimise the length of the at least one nozzle defined by the second layer.

Advantageously, the thickness of the first layer may be selected to increase or maximise the mechanical strength of the mesh element. In other words, the thickness of the first layer may be increased or maximised without affecting the length of the at least one nozzle defined by the second layer.

Preferably, the first layer comprises a first surface and a second surface, wherein the at least one channel extends between the first surface and the second surface.

Preferably, the second layer comprises an inner surface and an outer surface, wherein the at least one nozzle extends between the inner surface and the outer surface. Preferably, the inner surface of the second layer faces the second surface of the first layer. Preferably, the outer surface of the second layer faces away from the first layer.

Preferably, the first layer comprises a first thickness extending between the first surface and the second surface. Preferably, the second layer comprises a second thickness extending between the inner surface and the outer surface. Preferably, the first thickness is larger than the second thickness.

Preferably, the first layer has a first thickness of at least about 0.1 millimetres, preferably at least about 0.15 millimetres, preferably at least about 0.2 millimetres, preferably at least about 0.25 millimetres, preferably at least about 0.3 millimetres. Preferably, the first layer has a first thickness of less than about 1 millimetre, preferably less than about 0.95 millimetres, preferably less than about 0.9 millimetres, preferably less than about 0.85 millimetres, preferably less than about 0.8 millimetres, preferably less than about 0.75 millimetres, preferably less than about 0.7 millimetres, preferably less than about 0.65 millimetres, preferably less than about 0.6 millimetres.

Preferably, the second layer has a second thickness of at least about 1 micrometre, preferably at least about 2 micrometres, preferably at least about 3 micrometres, preferably at least about 4 micrometres, preferably at least about 5 micrometres, preferably at least about 6 micrometres, preferably at least about 7 micrometres, preferably at least about 8 micrometres, preferably at least about 9 micrometres. Preferably, the second layer has a second thickness of less than about 50 micrometres, preferably less than about 45 micrometres, preferably less than about 40 micrometres, preferably less than about 35 micrometres, preferably less than about 30 micrometres, preferably less than about 25 micrometres, preferably less than about 20 micrometres, preferably less than about 15 micrometres, preferably less than about 12 micrometres. The second layer may have a second thickness of about 10 micrometres.

Preferably, the at least one channel has a first length, wherein the first length is the shortest distance along the at least one channel between the first surface and the second surface. In embodiments in which the first layer comprises a first thickness, the first length of the at least one channel may be the same as the first thickness of the first layer. Preferably, the first length is at least about 0.1 millimetres, preferably at least about 0.15 millimetres, preferably at least about 0.2 millimetres, preferably at least about 0.25 millimetres, preferably at least about 0.3 millimetres. Preferably, the first length is less than about 1 millimetre, preferably less than about 0.95 millimetres, preferably less than about 0.9 millimetres, preferably less than about 0.85 millimetres, preferably less than about 0.8 millimetres, preferably less than about 0.75 millimetres, preferably less than about 0.7 millimetres, preferably less than about 0.65 millimetres, preferably less than about 0.6 millimetres. Preferably, the minimum cross-sectional of the at least one channel is orthogonal to the first length of the at least one channel.

Preferably, the at least one nozzle has a second length, wherein the second length is the shortest distance along the at least one nozzle between the inner surface and the outer surface. In embodiments in which the second layer comprises a second thickness, the second length of the at least one nozzle may be the same as the second thickness of the second layer. Preferably, the second length is at least about 1 micrometre, preferably at least about 2 micrometres, preferably at least about 3 micrometres, preferably at least about 4 micrometres, preferably at least about 5 micrometres, preferably at least about 6 micrometres, preferably at least about 7 micrometres, preferably at least about 8 micrometres, preferably at least about 9 micrometres. Preferably, the second length is less than about 50 micrometres, preferably less than about 45 micrometres, preferably less than about 40 micrometres, preferably less than about 35 micrometres, preferably less than about 30 micrometres, preferably less than about 25 micrometres, preferably less than about 20 micrometres, preferably less than about 15 micrometres, preferably less than about 12 micrometres. The second layer may have a second thickness of about 10 micrometres. Preferably, the maximum cross-sectional of the at least one nozzle is orthogonal to the second length of the at least one nozzle.

Preferably, the first length of the at least one channel is larger than the second length of the at least one nozzle.

Preferably, the at least one nozzle is a plurality of nozzles, wherein the plurality of nozzles overlie the at least one channel.

The at least one channel may be a single channel, wherein the plurality of nozzles overlies the single channel.

The at least one channel may comprise a plurality of channels, wherein each channel underlies at least two of the nozzles. The plurality of channels may comprise a first channel underlying a first plurality of the nozzles and a second channel underlying a second plurality of the nozzles.

Advantageously, providing a plurality of nozzles overlying each channel may simplify the manufacture of the mesh element by reducing the number of channels required in the first layer.

Preferably, each channel underlies at least about 5 nozzles, preferably at least about 10 nozzles, preferably at least about 15 nozzles, preferably at least about 20 nozzles. Preferably, each channel underlies less than about 150 nozzles, preferably less than about 140 nozzles, preferably less than about 130 nozzles, preferably less than about 120 nozzles, preferably less than about 110 nozzles, preferably less than about 100 nozzles.

Preferably, the minimum cross-sectional area of the at least one channel is at least about 0.01 square millimetres, preferably at least about 0.02 square millimetres, preferably at least about 0.03 square millimetres, preferably at least about 0.04 square millimetres, preferably at least about 0.05 square millimetres. Preferably, the minimum cross-sectional area of the at least one channel is less than about 0.5 square millimetres, preferably less than about 0.45 square millimetres, preferably less than about 0.4 square millimetres, preferably less than about 0.35 square millimetres, preferably less than about 0.3 square millimetres.

The at least one channel may have any suitable cross-sectional shape.

The at least one channel may have a first cross-sectional shape along a first line parallel with the first length of the at least one channel. The first cross-sectional shape of the at least one channel may be circular, elliptical, oval, triangular, square, rectangular, or any other polygonal shape. Preferably, the first cross-sectional shape of the at least one channel is square or rectangular.

The at least one channel may have a second cross-sectional shape orthogonal to the first length of the at least one channel. In other words, the second cross-sectional shape defines the minimum cross-sectional area of the at least one channel. The second cross-sectional shape of the at least one channel may be circular, elliptical, oval, triangular, square, rectangular, or any other polygonal shape. Preferably, the second cross-sectional shape of the at least one channel is circular. Preferably, the at least one channel has a minimum diameter. Preferably, the minimum diameter of the at least one channel is at least about 0.1 millimetres, preferably at least about 0.15 millimetres, preferably at least about 0.2 millimetres, preferably at least about 0.25 millimetres. Preferably, the minimum diameter of the at least one channel is less than about 1 millimetre, preferably less than about 0.95 millimetres, preferably less than about 0.9 millimetres, preferably less than about 0.85 millimetres, preferably less than about 0.8 millimetres, preferably less than about 0.75 millimetres, preferably less than about 0.7 millimetres, preferably less than about 0.65 millimetres, preferably less than about 0.6 millimetres.

Preferably, the maximum cross-sectional area of the at least one nozzle is at least about 0.01 square micrometres, preferably at least about 0.05 square micrometres, preferably at least about 0.1 square micrometres, preferably at least about 0.2 square micrometres, preferably at least about 0.3 square micrometres, preferably at least about 0.4 square micrometres, preferably at least about 0.5 square micrometres, preferably at least about 0.6 square micrometres, preferably at least about 0.7 square micrometres, preferably at least about 0.8 square micrometres. Preferably, the maximum cross-sectional area of the at least one nozzle is less than about 20 square micrometres, preferably less than about 19 square micrometres, preferably less than about 18 square micrometres, preferably less than about 17 square micrometres, preferably less than about 16 square micrometres, preferably less than about 15 square micrometres, preferably less than about 14 square micrometres, preferably less than about 13 square micrometres, preferably less than about 12 square micrometres, preferably less than about 11 square micrometres, preferably less than about 10 square micrometres.

Preferably, the at least one nozzle has a minimum cross-sectional area, wherein the minimum cross-sectional area of the at least one nozzle is equal to or less than the maximum cross-sectional area of the at least one nozzle. Preferably, the minimum cross-sectional area of the at least one nozzle is at least about 0.01 square micrometres, preferably at least about 0.05 square micrometres, preferably at least about 0.1 square micrometres, preferably at least about 0.2 square micrometres, preferably at least about 0.3 square micrometres, preferably at least about 0.4 square micrometres, preferably at least about 0.5 square micrometres, preferably at least about 0.6 square micrometres, preferably at least about 0.7 square micrometres, preferably at least about 0.8 square micrometres. Preferably, the minimum cross-sectional area of the at least one nozzle is less than about 20 square micrometres, preferably less than about 19 square micrometres, preferably less than about 18 square micrometres, preferably less than about 17 square micrometres, preferably less than about 16 square micrometres, preferably less than about 15 square micrometres, preferably less than about 14 square micrometres, preferably less than about 13 square micrometres, preferably less than about 12 square micrometres, preferably less than about 11 square micrometres, preferably less than about 10 square micrometres.

The at least one nozzle may have any suitable cross-sectional shape.

The at least one nozzle may have a first cross-sectional shape along a second line parallel with the second length of the at least one nozzle. The first cross-sectional shape of the at least one nozzle may be circular, elliptical, oval, triangular, square, rectangular, or any other polygonal shape. Preferably, the first cross-sectional shape of the at least one nozzle is triangular. The term "triangular" is used herein to refer to shapes comprising a triangle or triangular elements. For example, the first cross-sectional shape may comprise a triangle, a truncated triangle, a truncated triangle with a square or rectangular portion extending from the truncated part of the triangle, and so forth. Advantageously, a triangular first cross-sectional shape may provide the at least one nozzle with a convergent flow area. Advantageously, a convergent flow area may reduce or minimise the pressure required to force liquid through the at least one nozzle while also providing a desired minimum cross-sectional area of the at least one nozzle.

The at least one nozzle may have a second cross-sectional shape orthogonal to the second length of the at least one nozzle. In other words, the second cross-sectional shape defines the maximum cross-sectional area of the at least one nozzle. The second cross-sectional shape of the at least one nozzle may be circular, elliptical, oval, triangular, square, rectangular, or any other polygonal shape. Preferably, the second cross-sectional shape of the at least one nozzle is circular. Preferably, the at least one nozzle has a maximum diameter. Preferably, the maximum diameter of the at least one nozzle is at least about 0.1 micrometres, preferably at least about 0.25 micrometres, preferably at least about 0.5 micrometres, preferably at least about 0.75 micrometres, preferably at least about 1 micrometre. Preferably, the maximum diameter of the at least one nozzle is less than about 10 micrometres, preferably less than about 9 micrometres, preferably less than about 8 micrometres, preferably less than about 7 micrometres, preferably less than about 6 micrometres, preferably less than about 5 micrometres, preferably less than about 4 micrometres.

Preferably, the at least one nozzle has a minimum diameter, wherein the minimum diameter of the at least one nozzle is equal to or less than the maximum diameter of the at least one nozzle. Preferably, the minimum diameter of the at least one nozzle is at least about 0.1 micrometres, preferably at least about 0.25 micrometres, preferably at least about 0.5 micrometres, preferably at least about 0.75 micrometres, preferably at least about 1 micrometre. Preferably, the minimum diameter of the at least one nozzle is less than about 10 micrometres, preferably less than about 9 micrometres, preferably less than about 8 micrometres, preferably less than about 7 micrometres, preferably less than about 6 micrometres, preferably less than about 5 micrometres, preferably less than about 4 micrometres, preferably less than about 3 micrometres.

Preferably, the at least one nozzle has a minimum diameter of between about 0.1 micrometres and about 3 micrometres.

Advantageously, nozzles having a minimum diameter of less than about 3 micrometres facilitate the generation of liquid droplets having a diameter of less than 2.5 micrometres. Advantageously, liquid droplets having a diameter of less than 2.5 micrometres facilitate delivery of the liquid droplets to the pulmonary alveoli of a user. Typically, during inhalation, at least 80 percent of liquid droplets having a diameter of less than 2.5 micrometres will reach the pulmonary alveoli of a user.

Advantageously, nozzles having a minimum diameter of at least about 0.1 micrometres may reduce or minimise the pressure required to force a liquid through the nozzles while generating liquid droplets having a diameter of less than 2.5 micrometres.

In embodiments in which the second layer comprises an outer surface and an inner surface, preferably the mesh element comprises a hydrophobic coating on the outer surface of the second layer. The term "hydrophobic" is used herein to refer to a material that exhibits a water contact angle of larger than 90 degrees. Advantageously, in embodiments in which an aqueous liquid is dispensed through the mesh element, the hydrophobic coating advantageously increases or maximises the contact angle between the aqueous liquid and the outer surface of the second layer. Advantageously, an increased or maximised contact angle improves the release of liquid droplets from the outer surface of the second layer. Advantageously, improving the release of liquid droplet from the outer surface of the second layer may facilitate reducing or minimising the size of the liquid droplets.

The hydrophobic coating may be provided on one or more regions of the outer surface of the second layer. For example, the hydrophobic coating may comprise at least one annular region of hydrophobic material surrounding the at least one nozzle.

The hydrophobic coating may be provided on the entire outer surface of the second layer.

The hydrophobic coating may comprise at least one of polyurethane (PU), a perfluorocarbon (PFC), polytetrafluoroethylene (PTFE) and a super-hydrophobic metal. Suitable super-hydrophobic metals include microporous metals and metal meshes functionalised with carbon chains. Exemplary metals include copper and aluminium.

The hydrophobic coating may be formed by a surface modification of the second layer. For example, the outer surface of the second layer may be chemically modified to provide a desired degree of hydrophobicity.

The hydrophobic coating may be formed by deposition of a hydrophobic material on the outer surface of the second layer. For example, the hydrophobic material may be deposited on the outer surface of the second layer using at least one of a physical vapour deposition process and a chemical vapour deposition process.

The outer surface of the second layer may define an annular portion extending around the at least one nozzle, wherein a thickness of the second layer at each annular portion is larger than a thickness of the second layer between adjacent annular portions. Advantageously, the annular portion may facilitate separation of a liquid droplet from liquid remaining inside the at least one nozzle. In embodiments in which the mesh element comprises a hydrophobic coating, preferably at least part of the hydrophobic coating is provided on the annular portion. In embodiments in which the hydrophobic coating comprises one or more annular regions of hydrophobic material, preferably each annular region of hydrophobic material is positioned on an annular portion of the second layer.

Preferably, the annular portion has a rounded shape. Advantageously, a rounded shape may further facilitate separation of a liquid droplet from liquid remaining inside the at least one nozzle. The annular portion may have a semi-circular cross-sectional shape.

In embodiments in which the first layer comprises a first surface and a second surface, preferably the mesh element comprises a hydrophilic coating on the first surface of the first layer.

The first layer may comprise at least one channel surface extending between the first surface and the second surface, the at least one channel surface defining the at least one channel. The mesh element may comprise a hydrophilic coating on the at least one channel surface.

In embodiments in which the second layer comprises an outer surface and an inner surface, preferably the mesh element comprises a hydrophilic coating on the inner surface of the second layer.

The second layer may comprise at least one nozzle surface extending between the outer surface and the inner surface, the at least one nozzle surface defining the at least one nozzle. The mesh element may comprise a hydrophilic coating on the at least one nozzle surface.

The term "hydrophilic" is used herein to refer to a material that exhibits a water contact angle of less than 90 degrees. Advantageously, in embodiments in which an aqueous liquid is dispensed through the mesh element, the hydrophilic coating may facilitate the flow of the aqueous liquid towards the first layer and through the at least one channel and the at least one nozzle.

Hydrophilic coatings may comprise at least one of 3 polyamide, polyvinyl acetate, cellulose acetate, cotton, and one or more hydrophilic oxides. Suitable hydrophilic oxides include silicon dioxide, aluminium oxide, titanium dioxide, and tantalum pentoxide.

Hydrophilic coatings may be formed by a surface modification of at least one of the first layer and the second layer. For example, a surface of at least one of the first layer and the second layer may be chemically modified to provide a desired degree of hydrophilicity. In embodiments in which the hydrophilic coating comprises at least one hydrophilic oxide, the hydrophilic coating may be formed by oxidation of a material forming at least one of the first layer and the second layer.

Hydrophilic coatings may be formed by deposition of a hydrophilic material on a surface of at least one of the first layer and the second layer. For example, the hydrophilic material may be deposited using at least one of a physical vapour deposition process and a chemical vapour deposition process.

In embodiments in which the mesh element comprises a plurality of nozzles, the plurality of nozzles may be arranged in a repeating pattern on the second layer. The plurality of nozzles may be arranged randomly on the second layer.

The first layer and the second layer may be integrally formed. In other words, the first layer and the second layer may be formed as a single element.

The second layer may be formed separately from the first layer. Preferably, the second layer is secured to the first layer. For example, the second layer may be secured to the first layer by at least one of an interference fit, an adhesive, and a weld.

At least one of the first layer and the second layer may comprise at least one of platinum, palladium, nickel and stainless steel. At least one of the first layer and the second layer may comprise a mixture of at least one of platinum, palladium, nickel and stainless steel.

The mesh element may comprise silicon-on-insulator wafer. For example, the first layer may comprise a first silicon wafer and the second layer may comprise a second silicon wafer. The mesh element may comprise a buried oxide layer between the first silicon wafer and the second silicon wafer. The buried oxide layer may be formed by oxidation of a surface of at least one of the first silicon wafer and the second silicon wafer before the first and second silicon wafers are bonded to each other.

The at least one channel may be formed in the first layer using any suitable process. The at least one channel may be formed using at least one of laser perforation, etching, and electro discharge machining.

The at least one nozzle may be formed in the second layer using any suitable process. The at least one nozzle may be formed using at least one of laser perforation, etching, and electro discharge machining.

In embodiments in which the mesh element comprises a first silicon wafer, a buried oxide layer and a second silicon wafer, the at least one channel and the at least one nozzle may be formed by an etching process comprising multiple steps.

The etching process may be a first etching process. Preferably, the first etching process comprises a first step of etching one or more first discrete areas of the buried oxide layer. Each of the first discrete areas etched in the first step corresponds to a desired position of a nozzle in the completed mesh element. Each of the first discrete areas is only partially etched so that each of the first discrete areas does not extend through the entire thickness of the buried oxide layer.

Preferably, the first etching process comprises a second step of attaching the first silicon wafer to the second silicon wafer so that the buried oxide layer is positioned between the first silicon wafer and the second silicon wafer.

Preferably, the first etching process comprises a third step of etching through the second silicon wafer at one or more second discrete areas, wherein each of the second discrete areas overlies one of the first discrete areas. The one or more second discrete areas are etched through the entire thickness of the second silicon wafer so that each of the second discrete areas is in communication with the underlying first discrete area. Each of the second discrete areas forms a nozzle extending through the second silicon layer. Preferably, each of the second discrete areas has a minimum cross-sectional area corresponding to a desired minimum cross-sectional area of the nozzle. Preferably, the third step comprises reactive ion etching of the second silicon wafer at the one or more second discrete areas.

The first etching process may comprise a fourth step of further etching the second silicon wafer to provide each of the nozzles with a desired shape. The fourth step may comprise etching the second silicon wafer to provide each of the nozzles with a divergent shape. The fourth step may comprise etching the second silicon wafer with potassium hydroxide.

Preferably, the first etching process comprises a fifth step of etching one or more third discrete areas of the first silicon wafer, wherein each of the third discrete areas underlies at least one of the nozzles in the second silicon wafer. The one or more third discrete areas are etched through the entire thickness of the first silicon wafer Each of the third discrete areas forms a channel extending through the first silicon layer. Preferably, the fifth step comprises reactive ion etching of the first silicon wafer at the one or more third discrete areas.

Preferably, the first etching process comprises a sixth step of etching through the remainder of the buried oxide layer at each of the first discrete areas to provide fluid communication between each nozzle and the underlying channel. The sixth step may comprise wet chemical etching of the buried oxide layer at each of the first discrete areas. The wet chemical etching may comprise wet chemical etching with buffered hydrofluoric acid.

Instead of the first etching process, the etching process may be a second etching process. Preferably, the second etching process comprises a first step of etching one or more first discrete areas of the buried oxide layer. Each of the first discrete areas etched in the first step corresponds to a desired position of a nozzle in the completed mesh element. Each of the first discrete areas is only partially etched so that each of the first discrete areas does not extend through the entire thickness of the buried oxide layer.

Preferably, the second etching process comprises a second step of attaching the first silicon wafer to the second silicon wafer so that the buried oxide layer is positioned between the first silicon wafer and the second silicon wafer.

Preferably, the second etching process comprises a third step of etching one or more second discrete areas of the first silicon wafer, wherein each of the second discrete areas underlies at least one of the first discrete areas in the buried oxide layer. The one or more second discrete areas are etched through the entire thickness of the first silicon wafer Each of the second discrete areas forms a channel extending through the first silicon layer. Preferably, the third step comprises reactive ion etching of the first silicon wafer at the one or more second discrete areas.

Preferably, the second etching process comprises a fourth step of etching through the remainder of the buried oxide layer at each of the first discrete areas. The fourth step may comprise wet chemical etching of the buried oxide layer at each of the first discrete areas. The wet chemical etching may comprise wet chemical etching with buffered hydrofluoric acid.

Preferably, the second etching process comprises a fifth step of partially etching through the second silicon wafer at one or more third discrete areas, wherein each of the third discrete areas overlies one of the first discrete areas. Each of the third discrete areas forms part of a nozzle extending into the second silicon wafer. The fifth step may provide part of a desired shape of each nozzle. The fifth step may form a divergent portion of each nozzle. The fifth step may comprise etching the second silicon wafer with potassium hydroxide.

Preferably, the second etching process comprises a sixth step of etching through the remainder of the second silicon wafer at each of the third discrete areas so that each of the third discrete areas forms a nozzle extending through the second silicon wafer. Preferably, each portion of the second silicon wafer etched during the sixth step has a minimum cross-sectional area corresponding to a desired minimum cross-sectional area of the nozzle. Preferably, the sixth step comprises reactive ion etching of the second silicon wafer.

The second etching process may comprise a seventh step of further etching the second silicon wafer at each of the third discrete areas to further shape each of the nozzles. The seventh step may comprise etching the second silicon wafer with potassium hydroxide.

The second etching process may comprise an eighth step of etching the remainder of the buried oxide layer within each channel. The eighth step may comprise wet chemical etching of the buried oxide layer. The wet chemical etching may comprise wet chemical etching with buffered hydrofluoric acid.

The mesh element may comprise an electrical heating element positioned on a surface of the first layer or the second layer. Advantageously, the electrical heating element may be used to heat a liquid to be ejected through the at least one nozzle of the mesh element. Advantageously, heating a liquid may reduce the viscosity of the liquid. Advantageously, reducing the viscosity of the liquid may reduce or minimise the size of liquid droplets formed by forcing the liquid through the at least one nozzle.

The electrical heating element may be arranged to directly heat a liquid to be ejected through the at least one nozzle. The electrical heating element may be positioned on the first surface of the first layer.

The electrical heating element may be arranged to indirectly heat a liquid to be ejected through the at least one nozzle. The electrical heating element may be positioned on the outer surface of the second layer.

The electrical heating element may comprise a microelectromechanical systems heating element.

The electrical heating element may comprise an adhesion layer. The adhesion layer may facilitate bonding of the electrical heating element to at least one of the first layer and the second layer. The adhesion layer may comprise a metal. The adhesion layer may comprise tantalum.

The electrical heating element may comprise one or more resistive heating tracks. The one or more resistive heating tracks may comprise a metal. The one or more resistive heating tracks may comprise at least one of platinum, nickel, and polysilicon.

The electrical heating element may comprise a passivation layer. The passivation layer may comprise at least one of a metal oxide and a metal nitride. The passivation layer may comprise at least one of silicon nitride, silicon dioxide, titanium dioxide, and aluminium oxide.

According to a second aspect of the present invention there is provided an atomiser assembly for an aerosol-generating device, the atomiser assembly comprising a mesh element according to the first aspect of the present invention, in accordance with any of the embodiments described herein. The atomiser assembly also comprises an elastically deformable element, and a cavity defined between the mesh element and the elastically deformable element. The atomiser assembly also comprises a liquid inlet for providing a supply of liquid to be atomised to the cavity, and an actuator arranged to oscillate the elastically deformable element.

During use, liquid to be atomised is supplied to the cavity through the liquid inlet. The actuator oscillates the elastically deformable element to force at least some of the liquid within the cavity through the at least one channel and the at least one nozzle of the mesh element. The liquid forced through the at least one nozzle of the mesh element forms at least one droplet. The momentum of the liquid forced through the at least one nozzle to form the at least one droplet carries the at least one droplet away from the mesh element. Therefore, during use, the atomiser assembly generates an aerosol comprising liquid droplets ejected through the mesh element.

The atomiser assembly may comprise one or more walls at least partially defining the cavity between the mesh element and the elastically deformable element. The atomiser assembly may comprise at least one side wall. The cavity may be bound by the mesh element, the elastically deformable element and the at least one side wall. The liquid inlet may extend through the at least one side wall.

The cavity of the atomiser assembly may be any suitable shape and size. The cavity of the atomiser assembly may be substantially cylindrical.

Preferably, the actuator is arranged to oscillate the elastically deformable element towards and away from the mesh element. Preferably, the elastically deformable element is arranged opposite the mesh element.

The actuator may comprise any suitable type of actuator. The actuator may comprise a piezoelectric element.

The atomiser assembly may comprise a pre-loading element arranged to compress the actuator between the pre-loading element and the elastically deformable element. The pre-loading element may be adjustable to vary the compression of the actuator between the pre-loading element and the elastically deformable element. The pre-loading element may be adjustable. The pre-loading element may comprise a screw. The pre-loading element may be manually adjustable. The pre-loading element may be automatically adjustable. The atomiser assembly may comprise a motor arranged to move the pre-loading element to vary the compression of the actuator between the pre-loading element and the elastically deformable element.

According to a third aspect of the present invention there is provided an aerosol-generating device comprising an atomiser assembly according to the second aspect of the present invention, in accordance with any of the embodiments described herein. The aerosol-generating device also comprises a power supply and a controller arranged to control a supply of power from the power supply to the actuator of the atomiser assembly. The aerosol-generating device also comprises a device connector for receiving a liquid reservoir and arranged to supply liquid from a liquid reservoir to the liquid inlet of the atomiser assembly.

During use, the controller controls a supply of power from the power supply to the actuator to eject droplets of liquid through the mesh element, as described herein.

In embodiments in which the atomiser assembly comprises an electrical heating element, preferably the controller is arranged to control a supply of power from the power supply to the electrical heating element. Preferably, the aerosol-generating device is arranged to heat the electrical heating element during use to a temperature of between about 20 degrees Celsius and about 100 degrees Celsius. Preferably, the aerosol-generating device is arranged to heat the electrical heating element during use to a temperature of between about 70 degrees Celsius and about 90 degrees Celsius. Preferably, the aerosol-generating device is arranged to heat the electrical heating element during use to a temperature of about 80 degrees Celsius.

The power supply may be a DC voltage source. In preferred embodiments, the power supply is a battery. For example, the power supply may be a nickel-metal hydride battery, a nickel cadmium battery, or a lithium based battery, for example a lithium-cobalt, a lithium-iron-phosphate or a lithium-polymer battery. The power supply may alternatively be another form of charge storage device such as a capacitor. The power supply may require recharging and may have a capacity that allows for the storage of enough energy for use of the aerosol-generating device with one or more aerosol-generating articles.

The device connector for receiving a liquid reservoir may comprise at least one of a bayonet connector, a screw connector, a magnetic connector, and an interference fit connector.

Preferably, the aerosol-generating device comprises a housing. Preferably, the atomiser assembly, the controller and the power supply are arranged within the housing. The device connector for receiving a liquid reservoir may be arranged within the housing.

The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may define an aerosol chamber arranged to receive liquid droplets ejected from the mesh element during use of the aerosol-generating device. Preferably, the aerosol-generating device comprises an air inlet in fluid communication with the aerosol chamber. Preferably, the aerosol-generating device comprises an air outlet in fluid communication with the aerosol chamber.

The aerosol-generating device may comprise a mouthpiece in fluid communication with the air outlet. The mouthpiece may be formed integrally with the housing. The mouthpiece may be detachable from the housing.

During use, a user draws on the mouthpiece to draw air into the aerosol chamber through the air inlet. The air flows through the aerosol chamber where liquid droplets ejected from the mesh element are entrained within the airflow to form an aerosol. The aerosol flows out of the aerosol chamber through the air outlet and is delivered to the user through the mouthpiece.

The aerosol-generating device may comprise a sensor to detect airflow indicative of a user taking a puff. The air flow sensor may be an electro-mechanical device. The air flow sensor may be any of a mechanical device, an optical device, an opto-mechanical device and a micro electro-mechanical systems (MEMS) based sensor. The controller may be arranged to supply power from the power supply to the actuator of the atomiser assembly in response to a signal from the air flow sensor indicative of a user taking a puff.

The aerosol-generating device may comprise a manually operable switch for a user to initiate a puff. The controller may be arranged to supply power from the power supply to the actuator of the atomiser assembly in response to a signal from the manually operable switch.

Preferably, the aerosol-generating device comprises an indicator for indicating when power is being suppled from the power supply to the actuator of the atomiser assembly. The indicator may comprise a light arranged to illuminate when power is being suppled from the power supply to the actuator of the atomiser assembly.

The aerosol-generating device may comprise at least one of an external plug or socket and at least one external electrical contact allowing the aerosol-generating device to be connected to another electrical device. For example, the aerosol-generating device may comprise a USB plug or a USB socket to allow connection of the aerosol-generating device to another USB enabled device. The USB plug or socket may allow connection of the aerosol-generating device to a USB charging device to charge a rechargeable power supply within the aerosol-generating device. The USB plug or socket may support the transfer of data to or from, or both to and from, the aerosol-generating device. The aerosol-generating device may be connectable to a computer to transfer data to the aerosol-generating device.

In those embodiments in which the aerosol-generating device comprises a USB plug or socket, the aerosol-generating device may further comprise a removable cover that covers the USB plug or socket when not in use. In embodiments in which the USB plug or socket is a USB plug, the USB plug may additionally or alternatively be selectively retractable within the device.

According to a fourth aspect of the present invention there is provided an aerosol-generating system comprising an aerosol-generating device according to the third aspect of the present invention, in accordance with any of the embodiments described herein. The aerosol-generating system further comprises a liquid reservoir containing a liquid aerosol-forming substrate.

During use, the liquid reservoir is at least partially received by the device connector to supply the liquid aerosol-forming substrate to the liquid inlet of the atomiser assembly.

Preferably, the liquid reservoir comprises a container, wherein the liquid aerosol-forming substrate is positioned within the container. The container may be formed from any suitable material. The container may be formed from at least one of glass, metal, and plastic. The container may be transparent. The container may be translucent.

The container may define an opening through which the liquid aerosol-forming substrate may flow from the container. Preferably, the liquid reservoir comprises a seal overlying the opening to seal the liquid aerosol-forming substrate within the container. Preferably, the seal is at least one of removable and frangible. The aerosol-generating device may comprise a piercing element arranged to pierce the seal when the liquid reservoir is at least partially received by the device connector.

The liquid reservoir may comprise a reservoir connector arranged for connection with the device connector of the aerosol-generating device. The reservoir connector may comprise at least one of a bayonet connector, a screw connector, a magnetic connector, and an interference fit connector.

The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water.

The liquid aerosol-forming substrate may comprise nicotine and at least one aerosol former. The aerosol former may comprise glycerine. The aerosol-former may comprise propylene glycol. The aerosol former may comprise both glycerine and propylene glycol. The liquid aerosol-forming substrate may have a nicotine concentration of between about 2% and about 10%.

The invention will be further described, by way of example only, with reference to the accompanying drawings, in which.

Figure 1:
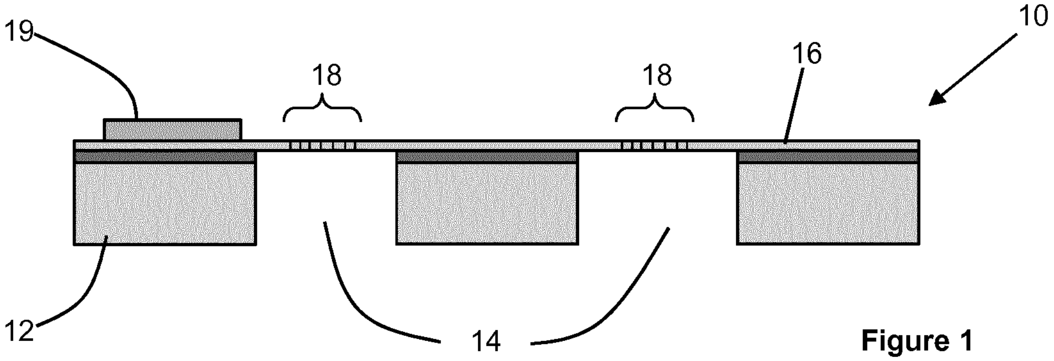
FIG. 1 shows a cross-sectional view of a mesh element according to an embodiment of the present invention.
Figure 2:
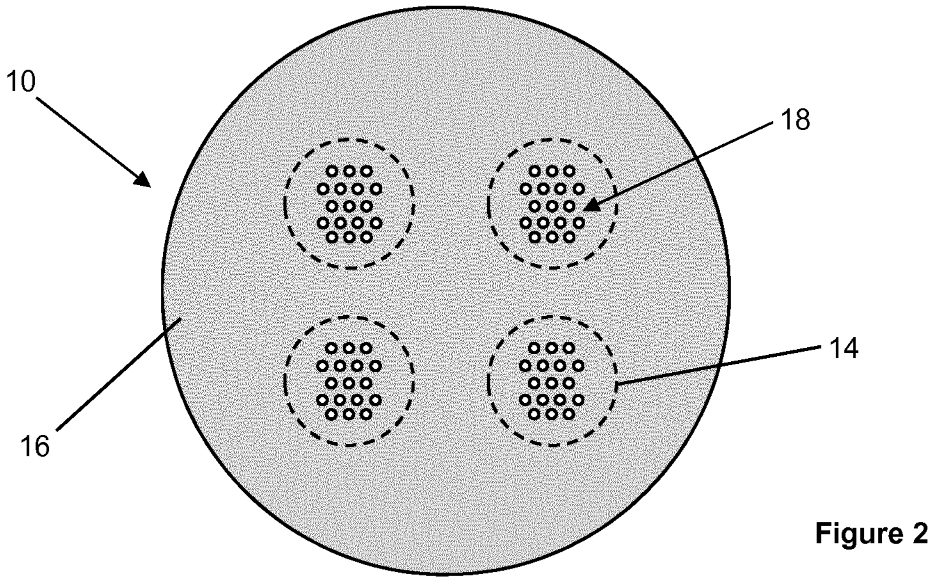
FIG. 2 shows a plan view of the mesh element of FIG. 1.

FIGS. 1 and 2 show a mesh element 10 according to an embodiment of the present invention. The mesh element 10 comprises a first layer 12 defining a plurality of cylindrical channels 14 and a second layer 16 defining a plurality of nozzles 18. The nozzles 18 are arranged into groups, wherein each group of nozzles 18 overlies one of the channels 14.

The mesh element 10 also comprises an electrical heating element 19 positioned on the second layer 16. During use, the electrical heating element 19 heats the mesh element 10, which heats liquid being ejected through the nozzles 18.

Figure 3:
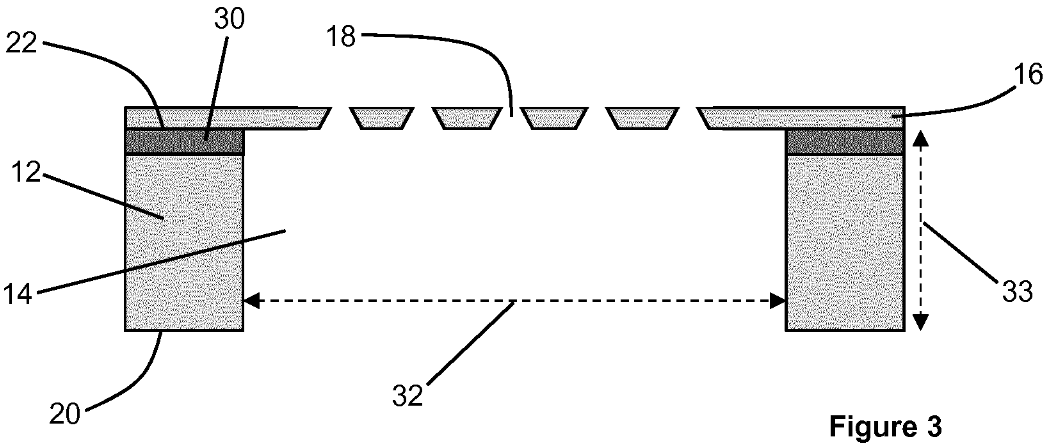
FIG. 3 shows an enlarged cross-sectional view of a portion of the mesh element of FIG. 1.
Figure 4:
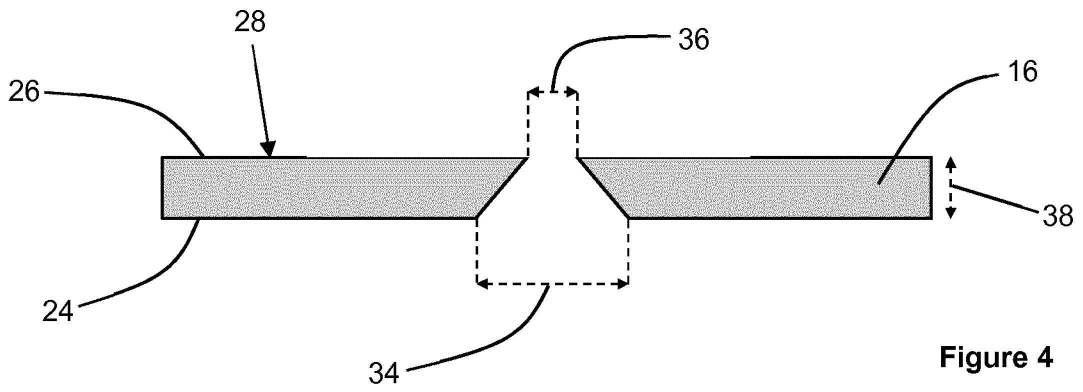
FIG. 4 shows a cross-sectional view of a single nozzle of the mesh element of FIG. 1.

FIGS. 3 and 4 show enlarged cross-sectional views of one of the channels 14 and one of the nozzles 18. The first layer 12 comprises a first surface 20 and a second surface 22. The second layer 16 comprises an inner surface 24 facing the second surface 22 of the first layer 12. The second layer 16 also comprises an outer surface 26 on which a hydrophobic coating 28 is provided. The first and second layers 12, 16 are formed from silicon wafers. A buried oxide layer 30 is formed by oxidation of the second surface 22 of the first layer 12 before the first and second layers 12, 16 are bonded together during the manufacture of the mesh element 10.

Each channel 14 has a minimum diameter 32 and a length corresponding to a thickness 33 of the first layer 12. The minimum diameter 32 of each channel 14 is significantly larger than a maximum diameter 34 of each overlying nozzle 18. Therefore, each channel 14 has a minimum cross-sectional area that is larger than the maximum cross-sectional area of each nozzle 18. As such, the length of the channel 14 does not contribute to a length of each nozzle 18 when determining the pressure required to force a given liquid through each nozzle 18. Advantageously, the thickness 33 of the first layer 12 can be selected to provide the mesh element with a desired strength and rigidity without affecting the pressure required to eject liquid droplets from the nozzles 18.

Each nozzle 18 has a triangular cross-sectional shape such that each nozzle 18 has a maximum diameter 34 at the inner surface 24 of the second layer 16 and a minimum diameter 36 at the outer surface 26 of the second layer 16. The minimum diameter 36 of each nozzle 18 is selected according to the desired size of liquid droplets to be ejected through the nozzle 18 during use. Each nozzle 18 has a length corresponding to a thickness 38 of the second layer 16. The thickness 38 of the second layer 16 is significantly smaller than the thickness 33 of the first layer 12 to minimise the length of each nozzle 18. The triangular cross-sectional shape of each nozzle 18 and the minimised length of each nozzle 18 reduce or minimise the pressure required to force a given liquid through each nozzle 18.

Figure 5:
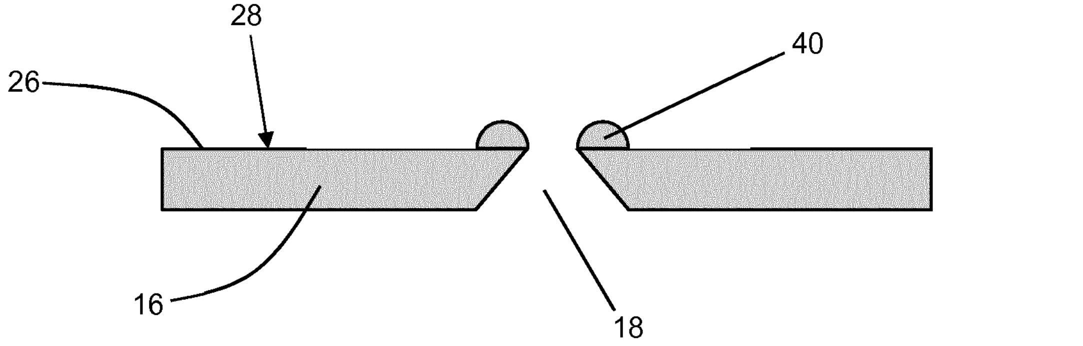
FIG. 5 shows a cross-sectional view of a single nozzle of the mesh element of FIG. 1 illustrating an alternative outer surface of the second layer.

As shown in FIG. 5, the outer surface 26 of the second layer 16 may comprise an annular portion 40 of increased thickness surrounding each nozzle 18. The semi-circular cross-sectional shape of each annular portion 40 facilitates separation of liquid droplets from liquid remaining inside each nozzle 18 during use.

Figure 6:
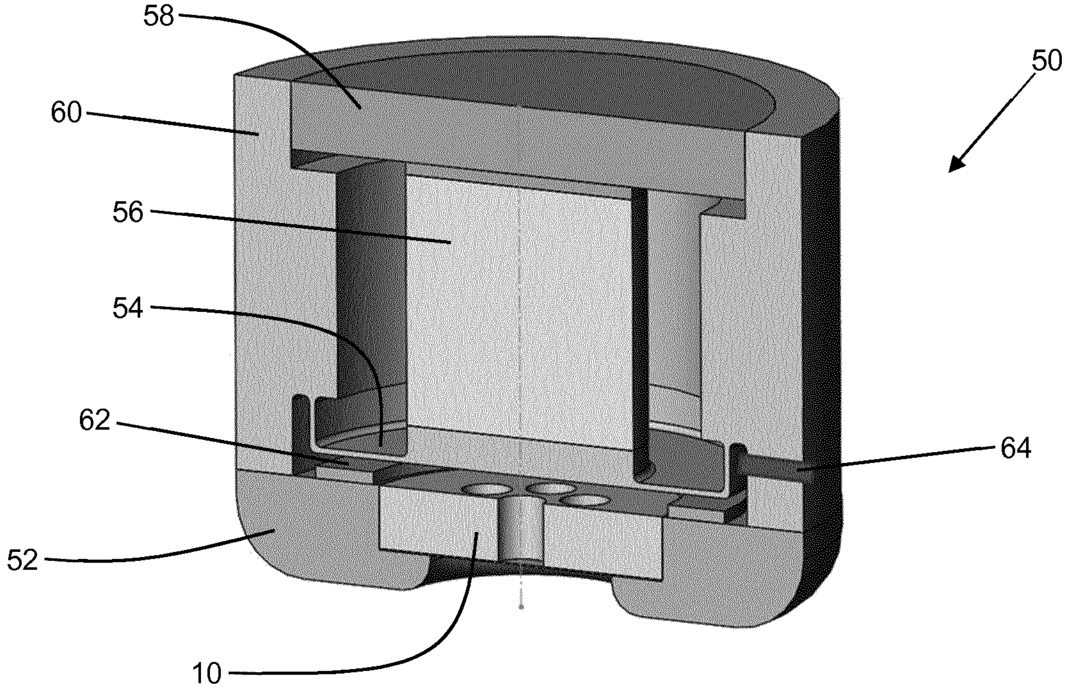
FIG. 6 shows a perspective cross-sectional view of an atomiser assembly comprising the mesh element of FIG. 1.

FIG. 6 shows a perspective cross-sectional view of an atomiser assembly 50 comprising the mesh element 10 of FIG. 1. The mesh element 10 is received within a mesh element housing 52. The atomiser assembly 50 also comprises an elastically deformable element 54 and an actuator 56 arranged to oscillate the elastically deformable element 54. The actuator 56 is a piezoelectric actuator.

The atomiser assembly 50 also comprises a pre-loading element 58 arranged to compress the actuator 56 between the pre-loading element 58 and the elastically deformable element 54. The pre-loading element 58, the actuator 56 and the elastically deformable element 54 are arranged within an actuator housing 60. The actuator housing 60 is attached to the mesh element housing 52 to define a cavity 62 between the mesh element 10 and the elastically deformable element 54. The actuator housing 60 defines a liquid inlet 64 for providing a supply of liquid to be atomised to the cavity 62.

During use, liquid to be atomised is supplied to the cavity 62 through the liquid inlet 64. The actuator 56 oscillates the elastically deformable element 54 to force at least some of the liquid within the cavity 62 through the channels 14 and the nozzles 18 of the mesh element 10. The liquid forced through the nozzles 18 of the mesh element 10 form droplets. The momentum of the liquid forced through the nozzles 18 to form the droplets carries the droplets away from the mesh element 10. Therefore, during use, the atomiser assembly 50 generates an aerosol comprising liquid droplets ejected through the mesh element 10.

Figure 7:
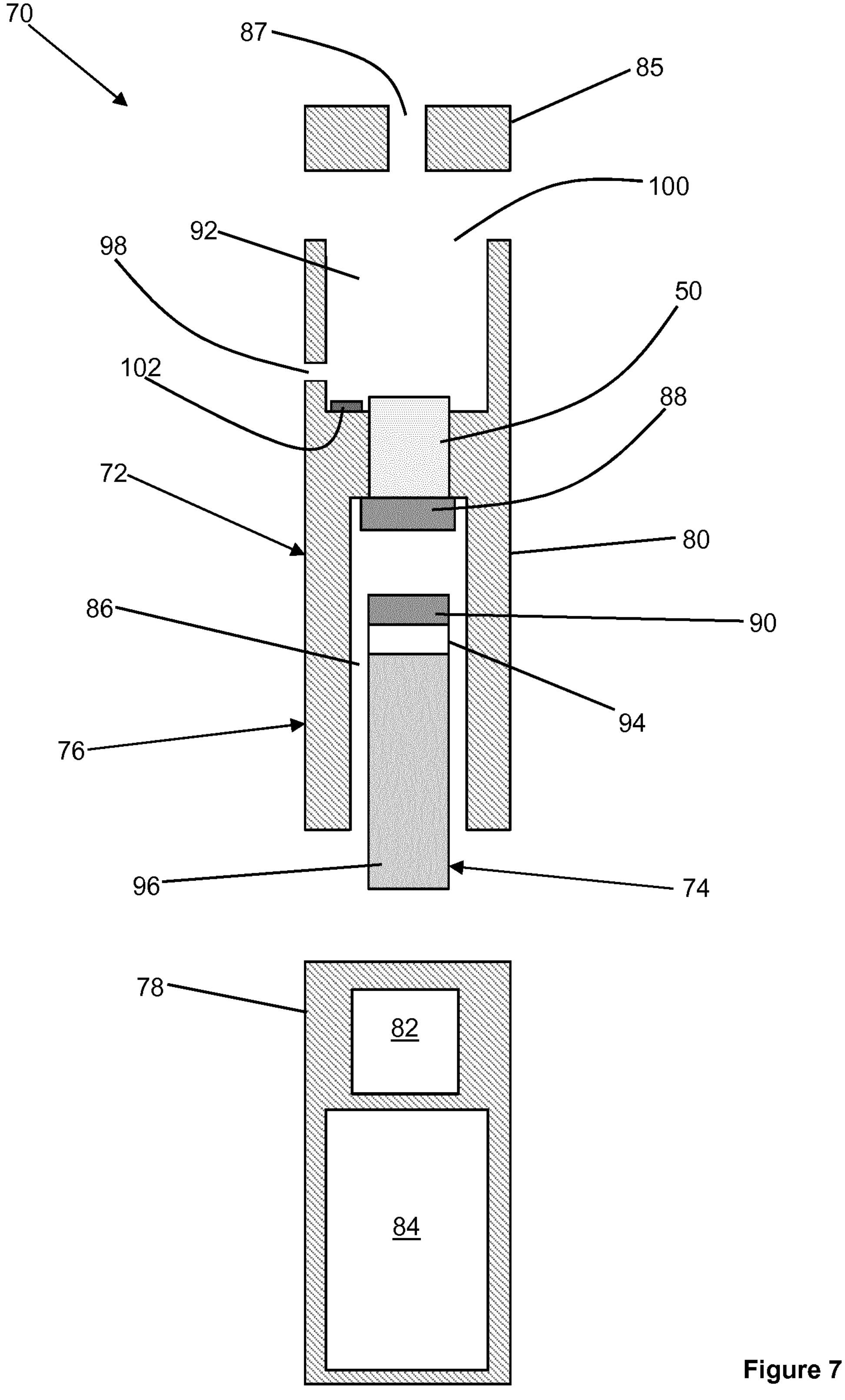
FIG. 7 shows a partially exploded cross-sectional view of an aerosol-generating system according to an embodiment of the present invention.

FIG. 7 shows a cross-sectional view of an aerosol-generating system 70 according to an embodiment of the present invention. The aerosol-generating system 70 comprises an aerosol-generating device 72 and a liquid reservoir 74.

The aerosol-generating device 72 comprises a housing 76 comprising a first housing portion 78 and a second housing portion 80. A controller 82 and a power supply 84 comprising a battery are positioned within the first housing portion 78. A mouthpiece 85 defining a mouthpiece channel 87 is connectable to the second housing portion 80.

The second housing portion 80 defines a liquid reservoir chamber 86 for receiving the liquid reservoir 74. The first housing portion 78 is detachable from the second housing portion 80 to allow replacement of the liquid reservoir 74.

The aerosol-generating device 72 also comprises a device connector 88 positioned within the liquid reservoir chamber 86 for engagement with a reservoir connector 90 that forms part of the liquid reservoir 74.

The aerosol-generating device 72 comprises the atomiser assembly 50 of FIG. 6 positioned within the second housing portion 80. The liquid inlet 64 of the atomiser assembly 50 is in fluid communication with the device connector 88. The mesh element 10 of the atomiser assembly 50 is positioned within an aerosol chamber 92 defined by the second housing portion 80.

The liquid reservoir 74 comprises a container 94 and a liquid aerosol-forming substrate 96 positioned within the container 94. When the reservoir connector 90 is engaged with the device connector 88, liquid aerosol-forming substrate 96 from the liquid reservoir 74 is supplied to the cavity 62 of the atomiser assembly 50 through the reservoir connector 90, the device connector 88, and the liquid inlet 64 of the atomiser assembly 50.

When the first housing portion 78 is connected to the second housing portion 80, the controller 82 controls a supply of power from the power supply 84 to the actuator 56 to eject droplets of the liquid aerosol-forming substrate 96 into the aerosol chamber 92 from the mesh element 10.

The second housing portion 80 defines an air inlet 98 and an air outlet 100 each in fluid communication with the aerosol chamber 92. During use, a user draws on the mouthpiece 85 to draw air into the aerosol chamber 92 through the air inlet 98. The air flows through the aerosol chamber 92 where droplets of liquid aerosol-forming substrate 96 ejected from the mesh element 10 are entrained within the airflow to form an aerosol. The aerosol flows out of the aerosol chamber 92 through the air outlet 100 and is delivered to the user through the mouthpiece channel 87.

The aerosol-generating device 72 also comprises an airflow sensor 102 positioned within the aerosol chamber 92. The airflow sensor 102 is arranged to provide a signal to the controller 82 indicative of a user drawing on the mouthpiece 85. The controller 82 is arranged to supply power from the power supply 84 to the actuator 56 of the atomiser assembly 50 only when the controller receives a signal from the airflow sensor 102 indicative of a user drawing on the mouthpiece 85.

The invention claimed is:

1. A mesh element for an atomiser assembly, the mesh element comprising:

a first layer defining at least one channel, the at least one channel comprising a minimum cross-sectional area; and a second layer overlying the first layer, wherein the second layer defines at least one nozzle comprising a maximum cross-sectional area, and wherein the second layer comprises an inner surface facing the first layer and an outer surface facing away from the first layer, wherein the at least one nozzle overlies the at least one channel, and wherein the maximum cross-sectional area of the at least one nozzle is smaller than the minimum cross-sectional area of the at least one channel, and wherein the outer surface of the second layer defines an annular portion extending around the at least one nozzle, wherein the annular portion has a semi-circular cross-sectional shape, and wherein a thickness of the second layer at each annular portion is larger than a thickness of the second layer between adjacent annular portions.

2. The mesh element according to claim 1, wherein the at least one nozzle is a plurality of nozzles, and wherein the plurality of nozzles overlie the at least one channel.

3. The mesh element according to claim 2, wherein the at least one channel further comprises a plurality of channels, and wherein each channel of the plurality of channels underlies at least two of the nozzles.

4. The mesh element according to claim 1, wherein the first layer comprises a first thickness, wherein the second layer comprises a second thickness, and wherein the first thickness is larger than the second thickness.

5. The mesh element according to claim 1, wherein the at least one channel further comprises a first length, wherein the at least one nozzle further comprises a second length, and wherein the first length is larger than the second length.

6. The mesh element according to claim 5, wherein the at least one nozzle further comprises a first cross-sectional shape along a line extending parallel with the second length of the at least one nozzle, and wherein the first cross-sectional shape of the at least one nozzle is triangular.

7. The mesh element according to claim 1, further comprising a hydrophobic coating on the outer surface of the second layer.

8. The mesh element according to claim 1, wherein the first layer comprises a first surface facing away from the second layer and a second surface facing the second layer, and wherein the mesh element further comprises a hydrophilic coating on the first surface of the first layer.

9. The mesh element according to claim 1, further comprising an electrical heating element disposed on a surface of the first layer or the second layer.

10. The mesh element according to claim 9, wherein the electrical heating element comprises a microelectromechanical systems heating element.

11. An atomiser assembly for an aerosol-generating device, the atomiser assembly comprising:

a mesh element according to claim 1;

an elastically deformable element;

a cavity defined between the mesh element and the elastically deformable element;

a liquid inlet configured to provide a supply of liquid to be atomized to the cavity; and an actuator configured to oscillate the elastically deformable element.

12. The atomiser assembly according to claim 11, wherein the actuator comprises a piezoelectric element.

13. An aerosol-generating device, comprising:

an atomizer assembly according to claim 11;

a power supply;

a controller configured to control a supply of power from the power supply to the actuator; and a connector configured to receive a liquid reservoir and to supply liquid from the liquid reservoir to the liquid inlet.

14. An aerosol-generating system, comprising:

an aerosol-generating device according to claim 13; and a liquid reservoir containing a liquid aerosol-forming substrate.

* * * * *